United States Patent [19]

Martin et al.

[11] Patent Number: 4,667,791
[45] Date of Patent: May 26, 1987

[54] FLUID FRICTION CLUTCH WITH RESERVE CHAMBER IN THE PRIMARY DISK

[75] Inventors: Hans Martin, Stuttgart; Andreas Braatz, Rutesheim, both of Fed. Rep. of Germany

[73] Assignee: Sueddeutsche Kuehlerfabrik Julius Fr. Behr GmbH, Stuttgart, Fed. Rep. of Germany

[21] Appl. No.: 807,952

[22] Filed: Dec. 12, 1985

[30] Foreign Application Priority Data

Dec. 14, 1984 [DE]  Fed. Rep. of Germany ....... 3445664

[51] Int. Cl.⁴ .................... F16D 35/00; F16D 43/25
[52] U.S. Cl. ......................... 192/58 B; 192/82 T; 192/103 R
[58] Field of Search ............ 192/58 B, 82 T, 103 R, 192/58 A, 58 R

[56] References Cited

U.S. PATENT DOCUMENTS

| | | | |
|---|---|---|---|
| 3,262,528 | 7/1966 | Weir | 192/82 T |
| 4,134,484 | 1/1979 | Lansinger | 192/58 B |
| 4,437,554 | 3/1984 | Haeck | 192/58 B |

FOREIGN PATENT DOCUMENTS 1243235  4/1960  France ................. 192/82 T

*Primary Examiner*—William F. Pate, III
*Assistant Examiner*—R. Chilcot, Jr.
*Attorney, Agent, or Firm*—Schwartz, Jeffery, Schwaab, Mack, Blumenthal & Evans

[57] ABSTRACT

Disclosed is a fluid friction clutch which comprises an input shaft, a primary disk connected to the shaft, and a secondary drive part, i.e., the clutch housing. The primary disk rotates in a work chamber arranged in the clutch housing and includes a reserve chamber in its interior. A fluid stream, which circulates between the work chamber on the secondary side and the reserve chamber on the primary side, is controlled via a valve attached to the primary disk. The valve is actuated via a tappet arranged coaxially in the input shaft. The orifice of the valve is arranged on the end face of the primary disk, and the associated valve closure element is located in the interior of the reserve chamber. An overflow orifice is present on the circumference of the primary disk in conjunction with a baffle, whereby pumping of the fluid from the work chamber into the reserve chamber is achieved. This fluid friction clutch is used, preferably, as the fan drive means for a radiator in motor vehicles.

20 Claims, 5 Drawing Figures

FLUID FRICTION CLUTCH WITH RESERVE CHAMBER IN THE PRIMARY DISK

BACKGROUND OF THE INVENTION

The present invention relates to a fluid friction clutch, and especially, fluid friction clutches which have a reserve chamber in the primary disk. Also, the present invention relates to a fan drive means for a radiator, which includes a fluid friction clutch of the above type.

A fluid friction clutch of this type is described in U.S. Pat. No. 3,262,528 and illustrated, for example, in FIG. 7 thereof. In this known fluid friction clutch, the primary disk, which includes an internal reserve chamber, rotates in the work chamber of the clutch housing (secondary part). The internal reserve chamber is connected to the work chamber through two orifices in the primary disk. One of the two orifices serves as a leakage oil bore and the other as an overflow orifice which is controlled by a movable baffle controlled as a function of the temperature. When the baffle protrudes into the work chamber, the viscous fluid is pumped out of the work chamber into the reserve chamber. Likewise, when the baffle is retracted into the reserve chamber, the fluid is forced out of the reserve chamber via the overflow orifice into the work chamber due to centrifugal force. With reference to FIG. 7 of U.S. Pat. No. 3,262,528, a fluid stream directed counterclockwise is thus produced in the work chamber of the clutch. The fluid, therefore, flows, first of all, radially outward of the overflow orifice, then passes from the rear part of the work chamber via the cylindrical circumferential part of the primary disk into the front part of the work chamber, that is to say, onto the front end face of the primary disk. There the fluid is conveyed radially inward, counter to the centrifugal force, by conveying devices (pump grooves), until it enters the reserve chamber again via the radially internal edge of the primary disk. There is superimposed upon this stream of fluid mentioned, controlled by the movable baffle, a second stream of fluid due to the leakage oil bore in the primary disk. This permanent leakage oil stream is provided for cooling purposes, in order to carry away the resulting heat in the case of excessive internal temperature, due to excessive slip, for example. One disadvantage of this known clutch is the relatively high no-load speed, which results, on the one hand, from the permanent leakage stream or cooling stream, and, on the other hand, from the baffle being located relatively far inward radially, and thereby, not being capable of pumping all the fluid out of the work chamber into the reserve chamber. Furthermore, the relatively high no-load speed of this clutch also means an unnecessary power consumption, which is undesirable. Lastly, due to its friction against the work surface on the secondary side, the baffle constitutes a wearing part with a limited useful life.

SUMMARY OF THE INVENTION

It is, therefore, an object of the present invention to provide a fluid friction clutch which reduces the no-load speed.

Another object of the present invention to provide a fluid friction clutch which reduces the power consumption.

It is a further object of the present invention to provide a fluid friction clutch in which the means for controlling the fluid stream and/or the corresponding valve mechanism experiences minimum wear.

A still further object of the present invention is to provide a fluid friction clutch having a highly compact construction in the axial direction, and improved hysteresis, combined with low production costs.

Therefore, in accordance with one aspect of the present invention, there has been provided a fluid friction clutch having a driving primary part, comprising an input shaft, a tappet coaxially arranged within the input shaft, a secondary drive part, a primary disk positioned within the secondary drive part, a fixed baffle extending radially outward from the primary disk, a work chamber between the primary disk and the secondary drive part and adapted to be filled with a viscus fluid, a reserve chamber positioned within the primary disk, a temperature-controlled fluid connection between the reserve chamber and the work chamber, wherein the fluid connection includes a valve orifice arranged in the end face of the primary disk and an overflow orifice circumferentially arranged on the primary disk, the overflow orifice being controlled by the fixed baffle, and a closure element for closing the valve orifice of the fluid connection.

By virtue of the valve orifice being arranged in the end face of the primary disk and being controllable by a valve closure element, and of the overflow orifice being arranged circumferentially in conjunction with a fixed baffle, a controlled circulation of the viscous fluid is obtained. Additionally, a very low, no-load speed results, especially due to the baffle being arranged radially in the outermost region, since, by this measure, when the valve is closed, virtually all the fluid can be pumped out of the work chamber into the reserve chamber. An additional leakage stream or cooling stream is no longer necessary with this construction; therefore, an improved hysteresis is obtained for the clutch. Also, the fixed baffle operates without contact and is therefore free from wear; the same applies to the valve mechanism comprising valve orifice, valve closure element and valve lever.

In a preferred embodiment, the baffle is attached to the primary disk, whereby a simple construction and an effective pumping of the fluid from the work chamber into the reserve chamber results. The advantageous pumping especially results in the embodiment of the present invention in which the baffle is an angled tab and extends into a housing groove formed in the secondary part.

In a further advantageous embodiment, the primary disk is constructed as a hollow disk with plane parallel work surfaces. A cheap and axially compact construction is obtained by this means. Relatively expensive cylindrical or conical work surfaces on the circumference of the primary disk are eliminated in favor of the cheaper end-face work surfaces. A particularly cost-favorable construction for the primary disk is obtained, if the hollow disk is formed by two interlaced pot-shaped sheet metal parts.

Also advantageous is the embodiment of the present invention in which an overrun spring is arranged between the tappet and valve lever, whereby production tolerances in the assembly of the clutch can simultaneously be compensated, so that a precise adjustment of the valve closure element for the opening time and closing time is possible. Two advantageous constructions of this overrun spring or compensating spring include the construction in which the overrun spring is constructed as a leaf spring integrated in the valve lever, and a second construction in which the overrun spring is a compression and helical spring. In the former case, the adjustment is performed in the fully assembled clutch from outside through the housing cover via the adjusting screw. After the adjustment process is complete, the cover is closed by a plastic plug. In the other case, the adjustment occurs in conjunction with a suitable device by placing a clamp ring onto the extreme end of the tappet.

Furthermore, in an additional preferred embodiment, a bimetallic strip is attached to the free end of the valve lever. The free end of the lever is braced against the inside of the primary disk and effects a closure of the valve orifice in the case of an increased internal temperature. This result avoids any overheating of the clutch and of the viscous fluid, the useful life of which is thereby lengthened.

In accordance with another aspect of the present invention there has been provided a fan drive means for a radiator comprising a fluid friction clutch as described above.

Further objects, features, and advantages of the present invention will become more apparent from a review of the detailed description of preferred embodiments which follows, when considered in view of the attached figures of drawing.

DETAILED DESCRIPTION OF PREFERRED EMBODIMENTS

Figure 1:
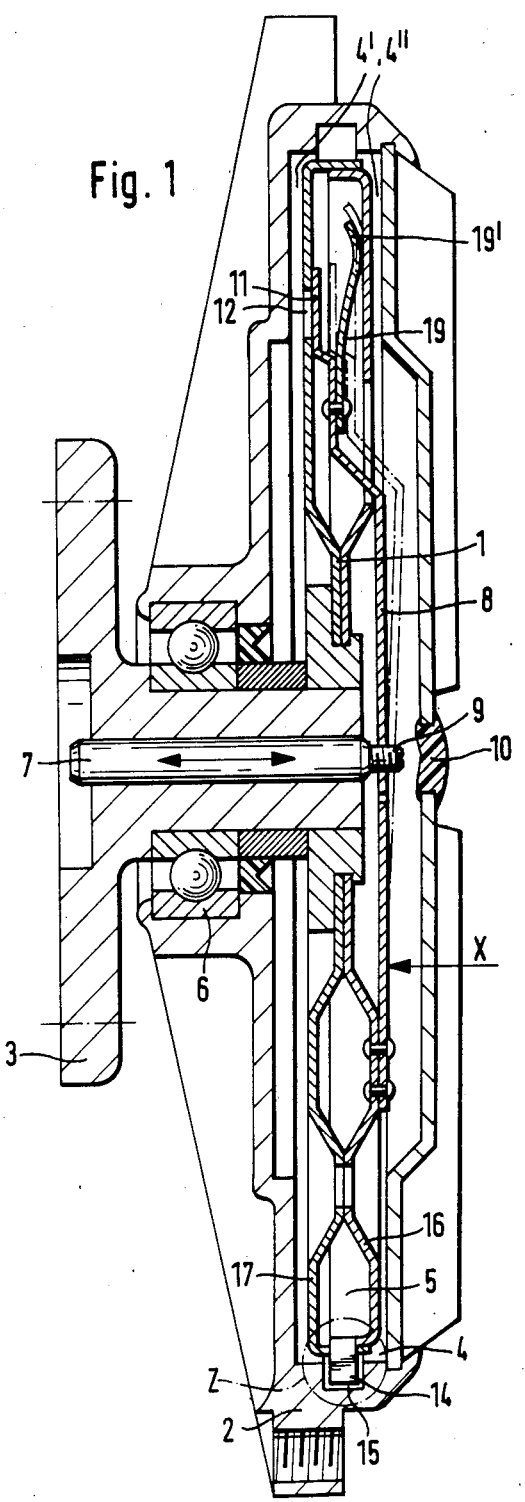
FIG. 1 is an axial sectional view through the clutch.

FIG. 1 shows the clutch according to the present invention, in which a primary disk 1 rotates in a secondary part or clutch housing 2 and is connected firmly to an input shaft 3. The clutch housing or the secondary part 2 is mounted rotatably, and simultaneously fixed axially, relative to the input shaft 3 via a grooved ball-bearing 6. The primary disk 1 is of hollow construction and exhibits a reserve chamber 5 in its interior. A work chamber 4, which exhibits so-called work gaps 4' and 4'', is formed between clutch housing 2 and primary disk 1. The reserve chamber 5 is in communication with the work chamber 4, on the one hand, via valve orifice 12, and, on the other hand, via an overflow orifice 13. The passage cross-section of the valve orifice 12 is controlled by a valve closure element 11 which is attached to the free end of the valve lever 8, the valve lever 8 being connected firmly by its other end to the primary disk 1 and constructed as a leaf spring. The valve lever 8 exhibits in is median region an overrun spring 18 of tongue-like construction, which is integrated with the valve lever 8, that is to say, is constructed in one piece with the latter. A tappet 7, which is arranged slidingly in a coaxially arranged bore of the input shaft 3, has its end near the clutch constructed as a screwthreaded pin 9, which is screwed into the tongue-shaped overrun spring 18. The front side of the clutch is closed in the region of the screwthreaded pin 9 by a plastic plug 10. The tappet 7 is actuated by a work element, preferably an element made of expanding material, not shown, which is stressed by the cooling medium. For example, when the piston of the work element is extruded, it acts against the valve lever 8 constructed as a leaf spring. The piston of the work element is returned to its original position by a return spring, not shown. A baffle 14, preferably constructed as a tab and connected to the primary disk 1, is arranged in the region of the overflow orifice 13. The primary disk 1 is constructed as a sheet metal part with two interlaced pot-shaped disks 16 and 17. The tab 14 may be constructed integrally with the one pot-shaped disk 16. A housing groove 15, which is arranged in the housing 2, corresponds in its cross-section to the profile of the tab 14, which runs without contact in this housing groove 15. A bimetallic strip 19, which is attached to the free end of the valve lever 8, approximately in the region of the valve closure element 11, rests with its free slightly domed end 19' on the inside of the primary disk 1.

Figures 4, 5:
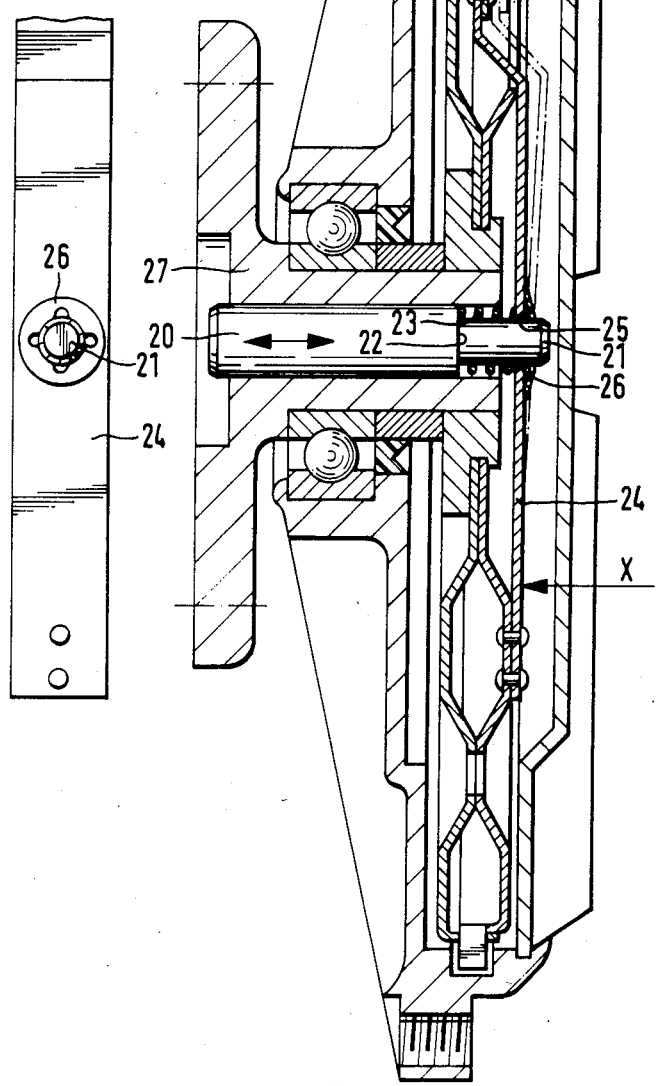
FIG. 4 is a further axial sectional view through the clutch with variant tappet adjustment.
FIG. 5 is a partial elevational view in the X direction of the valve lever according to FIG. 4.

In another embodiment of the present invention, FIGS. 4 and 5 illustrate a variant tappet 20 with a variant mode of fixing relative to the valve lever 24. The tappet 20, which is likewise arranged slidingly in the input shaft 27, exhibits in its region near the clutch a small-diameter attachment 21 which is shouldered by a flange 22 relative to the remaining part of the tappet 20. A helical compression spring 23, which is arranged on this attachment 21, rests, on the one hand, against the flange 22 of the tappet 20 and, on the other hand, against the valve lever 24. The distal end of the attachment 21 protrudes through a central orifice 25 in the valve lever 24 and is secured positively and frictionally by a clamp ring 26 on that side of the valve lever 24 remote from the compression spring 23.

The above-described fluid friction clutch, which is filled with a viscus fluid, for example, customary commercial silicone oil, operates in the following way. In the case of a cold engine, that is to say, an engine at a low cooling medium temperature, the piston of the expanding material element, not shown, is retracted, the valve lever 8 presses the valve closure element 11 onto the valve orifice 12, so that the latter is closed. With the primary disk running, at no-load speed for example, the viscous fluid present in the work chamber 4 is pumped by the baffle 14 via the overflow orifice 13 into the reserve chamber 5 within the primary disk 1. Due to the baffle 14 being arranged at the extremities of the working chamber and in combination with the housing groove 15, it is possible for virtually all the viscous fluid to be pumped out of the work chamber 4 into the reserve chamber 5. It is consequently possible to reduce the no-load speed to virtually zero, that is to say, complete switching off of the clutch.

When the engine temperature, and hence the cooling medium temperature, rises, the expanding material element becomes heated so that its piston is extruded and pushes the tappet 7 forward, i.e., from left to right in FIGS. 1 and 4. This tappet movement toward the valve lever 8 lifts the valve closure element 11 from the valve orifice 12 so that viscous fluid can flow out of the reserve chamber 5 into the work chamber 4 and its work gaps 4' and 4'' due to centrifugal action. Consequently, depending on the degree of charge of the work gaps 4' and 4'' through the viscous fluid, a torque can be transmitted from the primary disk 1 to the secondary part 2. The clutch engages slowly, that is to say, a fan attached to it delivers cooling air through a radiator of an internal combustion engine. Simultaneously, however, fluid is permanently conveyed by the fixed baffle 14 out of the work chamber 4 into the reserve chamber 5, so that when the valve 12 is open a circulation of fluid always occurs between reserve chamber and work chamber, whereby a cooling effect is also achieved in addition to the power transmission. However, should excessive evolution of heat occur within the clutch, due to excessive slip between the primary part and secondary part, for example, then the bimetallic strip 19, by bending due to temperature and bracing against the primary disk, causes a closure of the valve orifice 12 by the valve closure element 11. All the fluid is therefore again conveyed via the baffle 14 into the reserve chamber 5, so that no further evolution of heat can occur in the viscous fluid due to increased shear friction. The useful life of this viscous fluid is prolonged by this means.

Figure 2:
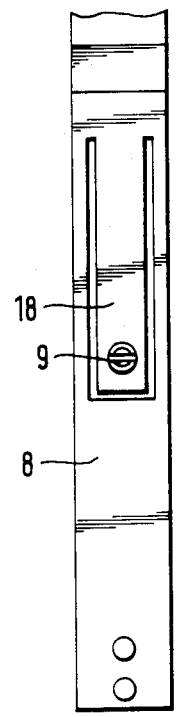
FIG. 2 is a partial elevational view in the X direction of the valve lever as shown in FIG. 1.
Figure 3:
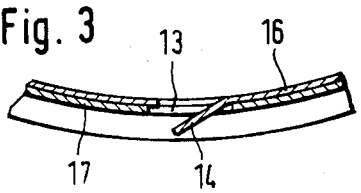
FIG. 3 is a detailed partial radial sectional view through the baffle with overflow orifice in the area Z of FIG. 1.

The adjustment of the valve lever 8 and/or of the valve closure element 11 is effected in the case of the embodiment shown in FIGS. 1 and 2 by the screwthreaded pin 9, which is screwed into the valve lever 8 and/or the tongue 18 from outside after the clutch has been assembled, until the valve closure element 11 rests upon the valve orifice 12. It is thereby ensured that the opening time, in other words, the engagement point of the clutch, is always the same. After adjustment has been performed the screwthreaded pin 9 is secured relative to the valve lever 8 by suitable known measures, so that the adjustment is maintained. After this, the orifice in the front side of the clutch is closed by a plastic plug 10.

In the case of the embodiment shown in FIGS. 4 and 5, the tappet 20, which carries the compression spring 23 on its end 21, is inserted through the central orifice 25 of the valve lever 24, and the valve lever 24 is likewise brought into abutment with the valve orifice via the valve closure element. When this is the case, the clamp ring 26 is pushed over the tappet end 21 and the tappet is fixed axially relative to the valve lever 24 in this manner. The production tolerances between tappet, on the one hand, and the clutch parts arranged on the input shaft, on the other hand, are thus compensated, so that a precise engagement and disengagement of the clutch is ensured.

The present fluid friction clutch is especially applicable as a fan drive means for a radiator in motor vehicles.

What is claimed is:

1. A fluid friction clutch having a driving primary part and a secondary driven part, comprising:
    an input shaft;
    said driving primary part comprising a primary disk positioned within said secondary driven part and being attached to said input shaft;
    a tappet coaxially arranged within said input shaft, said tappet being axially movable in response to variation of an external temperature source;
    a fixed baffle extending radially outward from said primary disk;
    a work chamber between said primary disk and said secondary driven part and adapted to be filled with a viscous fluid;
    a reserve chamber positioned within said primary disk; and
    a temperature-controlled fluid connection between said reserve chamber and said work chamber, wherein said fluid connection includes a valve orifice arranged in the end face of said primary disk and an overflow orifice arranged on the peripheral circumference of said primary disk, said overflow orifice being controlled by said fixed baffle, and a closure element for closing said valve orifice of said fluid connection, said closure element being controlled by said tappet.

2. A fluid friction clutch as claimed in claim 1, wherein said baffle is attached to said primary disk at its radially peripheral edge.

3. A fluid friction clutch as claimed in claim 2, wherein said baffle comprises a tab bent radially outwardly.

4. A fluid friction clutch as claimed in claim 3, wherein said secondary driven part comprises a housing groove and said tab rotates in said groove.

5. A fluid friction clutch as claimed in claim 1, wherein said primary disk is substantially hollow and has a minimal axial depth.

6. A fluid friction clutch as claimed in claim 1, wherein the outer faces of said primary disk and the inner faces of said secondary driven part form the perimeters of said work chamber.

7. A fluid friction clutch as claimed in claim 6, wherein said primary disk comprises sheet metal.

8. A fluid friction clutch as claimed in claim 7, wherein said primary disk comprises two pan-shaped disks telescopically interengaged at their open ends to define said reserve chamber.

9. A fluid friction clutch as claimed in claim 1, further comprising a lever extending from said tappet to said closure element.

10. A fluid friction clutch as claimed in claim 9, further comprising an overrun spring positioned between said tappet and said lever.

11. A fluid friction clutch as claimed in claim 10, wherein said overrun spring comprises a tongue-shaped leaf spring, said leaf spring being integrally connected to said lever.

12. A fluid friction clutch as claimed in claim 9, further comprising a screwthreaded pin firmly connected to said tappet and screwed into said lever, wherein said pin adjustably positions said lever.

13. A fluid friction clutch as claimed in claim 10, wherein said overrun spring comprises a compression spring, said compression spring being guided on the end of said tappet and braced against said tappet and said lever.

14. A fluid friction clutch as claimed in claim 13, wherein said tappet includes a flange for bracing said compression spring.

15. A fluid friction clutch as claimed in claim 13, wherein said lever includes an orifice, and wherein the end of said tappet extends through said orifice and is fixedly secured in an adjustable position on the side of said lever remote from said compression spring.

16. A fluid friction clutch as claimed in claim 15, further comprising a clamp ring for fixedly securing the end of said tappet.

17. A fan drive means for a radiator comprising a fan and, connected thereto, a fluid friction clutch as claimed in claim 1.

18. A fluid friction clutch having a driving primary part and a secondary driven part, comprising:
    an input shaft;

said driving primary part comprising a primary disk positioned within said secondary driven part and being attached to said input shaft;

a tappet coaxially arranged within said input shaft, said tappet being axially movable in response to variation of an external temperature source;

a fixed baffle extending radially outward from said primary disk;

a work chamber between said primary disk and said secondary driven part and adapted to be filled with a viscous fluid;

a reserve chamber positioned within said primary disk;

a temperature-controlled fluid connection between said reserve chamber and said work chamber, wherein said fluid connection includes a valve orifice arranged in the end face of said primary disk and an overflow orifice arranged on the peripheral circumference of said primary disk, said overflow orifice being controlled by said fixed baffle, a closure element for closing said valve orifice of said fluid connection, and a lever extending from said tappet to said closure element, whereby said closure element is controlled by said tappet; and a bimetallic strip, one end of said strip being attached to said lever and the other end being braced against the interior of said primary disk, whereby said strip closes said valve orifice when the internal temperature reaches a predetermined level.

19. A fluid friction clutch as claimed in claim 1, wherein said closure element is positioned on the inside of said reserve chamber.

20. A fluid friction clutch as claimed in claim 1, wherein said temperature-controlled fluid connection is the sole fluid connection for circulation of viscous fluid between the reserve chamber and the working chamber.

* * * * *

UNITED STATES PATENT AND TRADEMARK OFFICE
CERTIFICATE OF CORRECTION

PATENT NO. : 4,667,791

DATED : May 26, 1987

INVENTOR(S) : MARTIN et al.

It is certified that error appears in the above-identified patent and that said Letters Patent is hereby corrected as shown below:

On the Title Page, [73] Assignee: should read:

Sueddeutsche Kuehlerfabrik
    Julius Fr. Behr GmbH & Co. KG
    Stuttgart, Fed. Rep. of Germany and Daimler-Benz Aktiengesellschaft
    Stuttgart, Fed. Rep. of Germany

Signed and Sealed this
Twenty-seventh Day of October, 1987

*Attest:*

DONALD J. QUIGG

*Attesting Officer*       *Commissioner of Patents and Trademarks*